US010692525B2

(12) United States Patent
Goggin et al.

(10) Patent No.: US 10,692,525 B2
(45) Date of Patent: Jun. 23, 2020

(54) ON WAFER LASER STABILITY CONTROL FOR HEAT-ASSISTED MAGNETIC RECORDING

(71) Applicant: Seagate Technology LLC, Cupertino, CA (US)

(72) Inventors: Aidan Dominic Goggin, Donegal (IE); Mark Anthony Gubbins, Donegal (IE); Kelly Elizabeth Callan, Derry (GB); Reyad Mehfuz, Derry (GB); Marcus B. Mooney, Donegal (IE); Fadi El Hallak, Derry (GB); Paula Frances McElhinney, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/136,389

(22) Filed: Sep. 20, 2018

(65) Prior Publication Data
US 2020/0098391 A1    Mar. 26, 2020

(51) Int. Cl.
| G11B 7/126 | (2012.01) |
| G11B 11/105 | (2006.01) |
| G11B 5/48 | (2006.01) |
| G11B 5/00 | (2006.01) |
| G11B 7/1263 | (2012.01) |
| G11B 7/1267 | (2012.01) |
| G11B 5/60 | (2006.01) |

(52) U.S. Cl.
CPC ............ G11B 7/126 (2013.01); G11B 5/4866 (2013.01); G11B 5/6088 (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| 8,456,969 | B1 * | 6/2013 | Mooney | G11B 5/314 369/112.27 |
| 9,236,081 | B1 * | 1/2016 | Chu | G11B 11/10595 |
| 9,576,595 | B1 * | 2/2017 | Hipwell, Jr. | G11B 5/1272 |
| 9,583,135 | B1 * | 2/2017 | Ma | G11B 20/10305 |
| 9,607,638 | B1 * | 3/2017 | Olson | G11B 5/105 |
| 9,984,719 | B2 * | 5/2018 | Matousek | G11B 7/126 |
| 10,255,940 | B1 * | 4/2019 | Macken | G11B 5/012 |
| 2010/0074062 | A1 * | 3/2010 | Kamijima | G11B 5/02 369/13.14 |
| 2010/0328807 | A1 * | 12/2010 | Snyder | G11B 5/102 360/59 |
| 2011/0243176 | A1 * | 10/2011 | Mooney | G11B 5/105 372/50.124 |

(Continued)

*Primary Examiner* — Tan X Dinh
(74) *Attorney, Agent, or Firm* — Mueting Raasch Group

(57) ABSTRACT

An apparatus includes a substrate. A laser is formed on a non-self supporting structure and bonded to the substrate. A waveguide is deposited proximate the laser. The waveguide is configured to communicate light from the laser to a near-field transducer that directs energy resulting from plasmonic excitation to a recording medium. A light detector is configured to detect an amount of light. At least one laser heater is disposed proximate the laser. A controller is configured to control current supplied to the at least one heater based on the detected amount of light.

20 Claims, 7 Drawing Sheets

(56) References Cited

U.S. PATENT DOCUMENTS

| | | |
|---|---|---|
| 2015/0036468 A1 | 2/2015 | Boone, Jr. |
| 2016/0087402 A1* | 3/2016 | Tatah .................. H01S 5/06804 372/34 |
| 2016/0104514 A1* | 4/2016 | Burnett ................ G11B 5/6088 369/13.02 |

* cited by examiner

ON WAFER LASER STABILITY CONTROL FOR HEAT-ASSISTED MAGNETIC RECORDING

SUMMARY

Embodiments described herein are directed to an apparatus comprising a substrate. A laser is formed on a non-self supporting structure and bonded to the substrate. A waveguide is deposited proximate the laser. The waveguide is configured to communicate light from the laser to a near-field transducer that directs energy resulting from plasmonic excitation to a recording medium. A light detector is configured to detect an amount of light. At least one laser heater is disposed proximate the laser. A controller is configured to control current supplied to the at least one heater based on the detected amount of light.

Embodiments are directed to a system comprising a recording head comprising a substrate. A laser is formed on a non-self supporting structure and bonded to the substrate. A waveguide is deposited proximate the laser. The waveguide is configured to communicate light from the laser to a near-field transducer that directs energy resulting from plasmonic excitation to a recording medium. A light detector configured to detect an amount of light. At least one laser heater is disposed proximate the laser. A controller is configured to control current supplied to the at least one heater based on the detected amount of light.

Embodiments are directed to a method comprising detecting an amount of light proximate a waveguide of a recording head. It is determined whether the amount of light detected is greater than or equal to a predetermined threshold. If it is determined that the amount of light detected is greater than or equal to the predetermined threshold, A current provided to a laser heater for an on-wafer laser of the recording head is adjusted.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification, reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
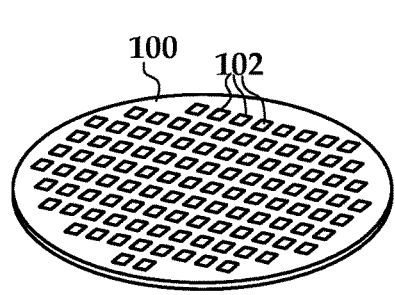
FIGS. 1-5 are diagrams showing a transfer printing process in accordance with embodiments described herein.

This disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," and "head" will be used interchangeably. In a HAMR device, a read/write head includes an energy source (e.g., a laser diode) that heats a recording medium during writing. The HAMR read/write head generally includes some form of optical transmission path, such as a waveguide and near-field transducer, that shapes and directs the energy from the energy source to the recording medium.

In some implementations, the read/write head and laser diode are formed using separate processes, aligned using a surface-mount placement process (e.g., pick and place), and bonded together (e.g., using solder). While this type of assembly process is well-established for assembly of electronic components, there are challenges in mass-assembly of HAMR read/write heads using these processes.

One challenge in assembling laser diodes onto a read/write head is the precise alignment needed. While electrical components can operate if misaligned so long as the conductive paths are sufficiently established, misalignment between a laser and read/write head can result in a loss of optical efficiency that can render the head unusable. Another challenge relates to the size of the resulting assembly. The read/write head has a limited vertical distance (normal to the recoding surface) in which to operate. In some implementations, the addition of a laser and intermediate structures (e.g., submounts) can exceed the available spacing. Such additional structure can add undesirable weight, as do the laser packaging and electrical joints that electrically couple the laser to the read/write head.

In the present disclosure, hard drive recording heads are used onto which at least part of a semiconductor laser (e.g., crystalline, epitaxial layer) is not self-supporting (e.g., not a separately packaged device) but is physically carried by same substrate that carries the other components of the read/write head (e.g., write coil and poles, reader stack) without the use of a separate or intermediate support during attachment. Carrying the semiconductor laser with the read/write head substrate, without a separate or intermediate support substrate, can help to reduce the size and weight of the head, and it can also allow for the use of laser geometries and designs that are very different from simple edge-emitting cleaved facet lasers that have been proposed in the past. A laser heat sink may be provided that is configured to reduce the temperature of the laser diode and various surrounding structures. The heat sink may also be used to provide good thermal coupling between the laser diode and the substrate and other surrounding components of the hard drive recording head.

In at least some cases, parts of the laser (e.g., GaAs active region) are incompatible with epitaxial growth on the substrate. As such, the laser cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the slider-integral laser.

This process of transferring non-self-supporting layers of epitaxial-growth-incompatible layers is referred to herein as On-Wafer Laser (OWL) process integration. This process may also be referred to as transfer printing, dry transfer printing, nanoprinting, etc. In FIGS. 1-5, block diagrams illustrate transfer printing of components onto a recording head according to an example embodiment.

In FIG. 1, a donor substrate 100 includes a number of components 102 (e.g., epitaxial layers) formed using a first process (e.g., crystalline growth). The components 102 may include one or more layers of materials that have been processed via photolithography and/or other processes to attain a final shape and position on the substrate 100. A sacrificial layer may also be included between the components 102 and the substrate 100 to allow separation. This fabrication could include some or all of the following: epitaxial material layer, adhesion or protection layers, carrier layers (to increase thickness for easier transport), bonding layers to aid in best print transfer, and integration layers to enable subsequent integration (e.g., stop features to allow planarization after integration).

Figure 2:
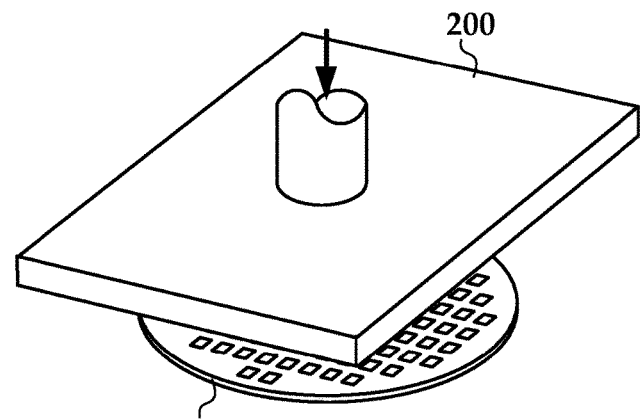
Figure 3:
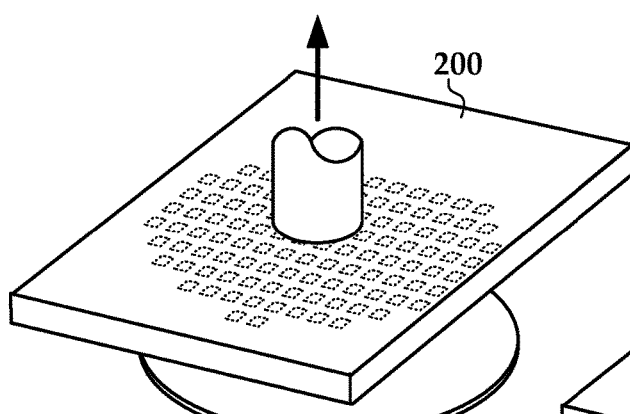

As seen in FIG. 2, a transfer print head 200 is lowered onto the substrate material (or material stack) onto a target substrate (typically of a different material). The transfer print head 200 is lifted as shown in FIG. 3, taking the components 102 with it. In this way, "islands" of the component material are then transferred to a target substrate 210 as shown in FIGS. 4-5.

Figure 4:
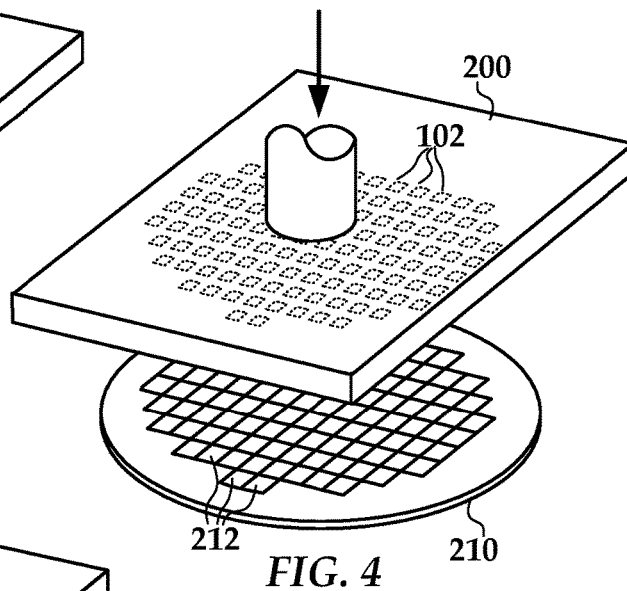
Figure 5:
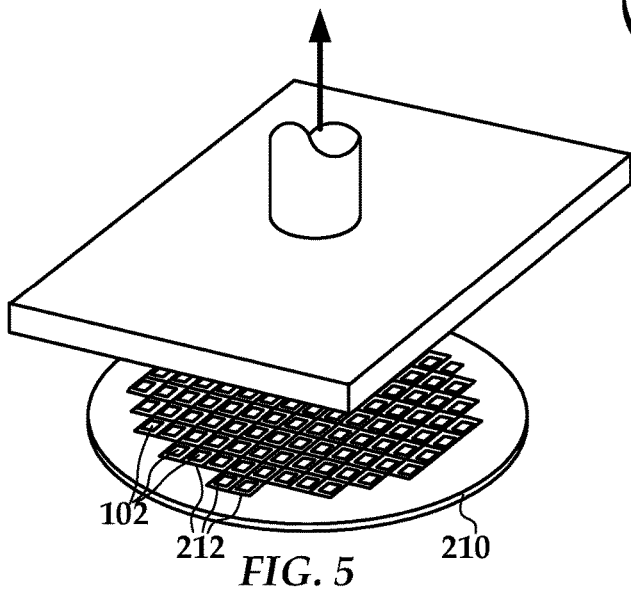

As seen in FIG. 4, the transfer print head 200 is lowered over a wafer 210 that includes a number of partially-processed recording heads 212. The transfer print head 200 presses the components 102 on to the wafer 210 and is then pulled away as seen in FIG. 5. This attaches the components 102 to the recording heads 212. Afterwards, the wafer 210 is further processed, e.g., etching the components 102 to final shape and alignment, and depositing additional layers of material to form the remaining recording head components.

Figure 6:
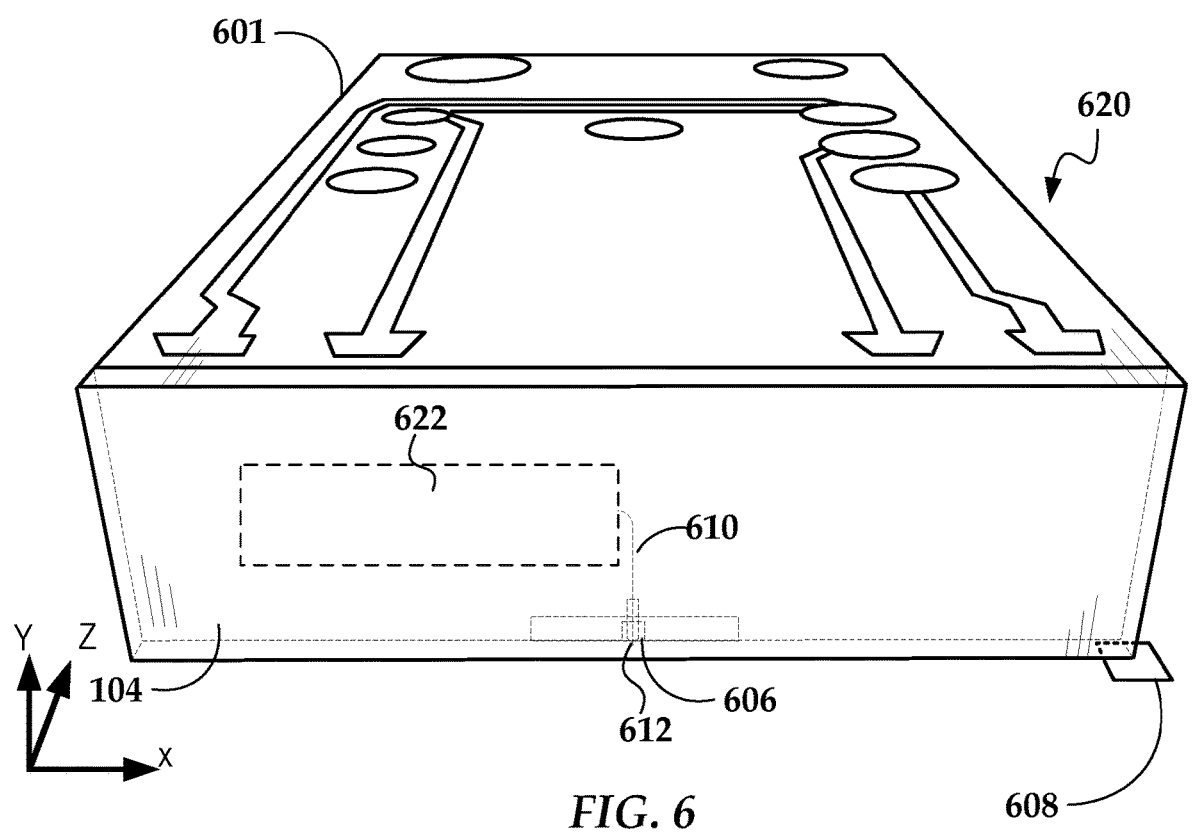
FIG. 6 is a perspective view of a slider having an On-Wafer Laser (OWL) in accordance with embodiments described herein.

FIG. 6 shows a perspective view of a HAMR write head 620 in accordance with embodiments described herein. As described above, at least part of the laser diode 622 is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. The laser diode 622 delivers light to a region proximate a HAMR read/write transducer 606, which is located near the media-facing surface 608. The media-facing surface 608 faces and is held proximate to the moving media surface while reading and writing to the media. The media-facing surface 608 may be configured as an air-bearing surface (ABS) that maintains separation from the media surface via a thin layer of air.

The energy is used to heat the recording media as it passes by the read/write transducer 606. Optical coupling components, such as a waveguide system 610, are formed integrally within the slider body 601 (near a trailing edge surface in this example) and function as an optical path that delivers energy from the laser diode 622 to the recording media via a near-field transducer 612. The near-field transducer 612 is located near the read/write transducer 606 and causes heating of the media during recording operations. The near-field transducer 612 may be made from plasmonic materials such as gold, silver, copper, etc.

Figure 7:
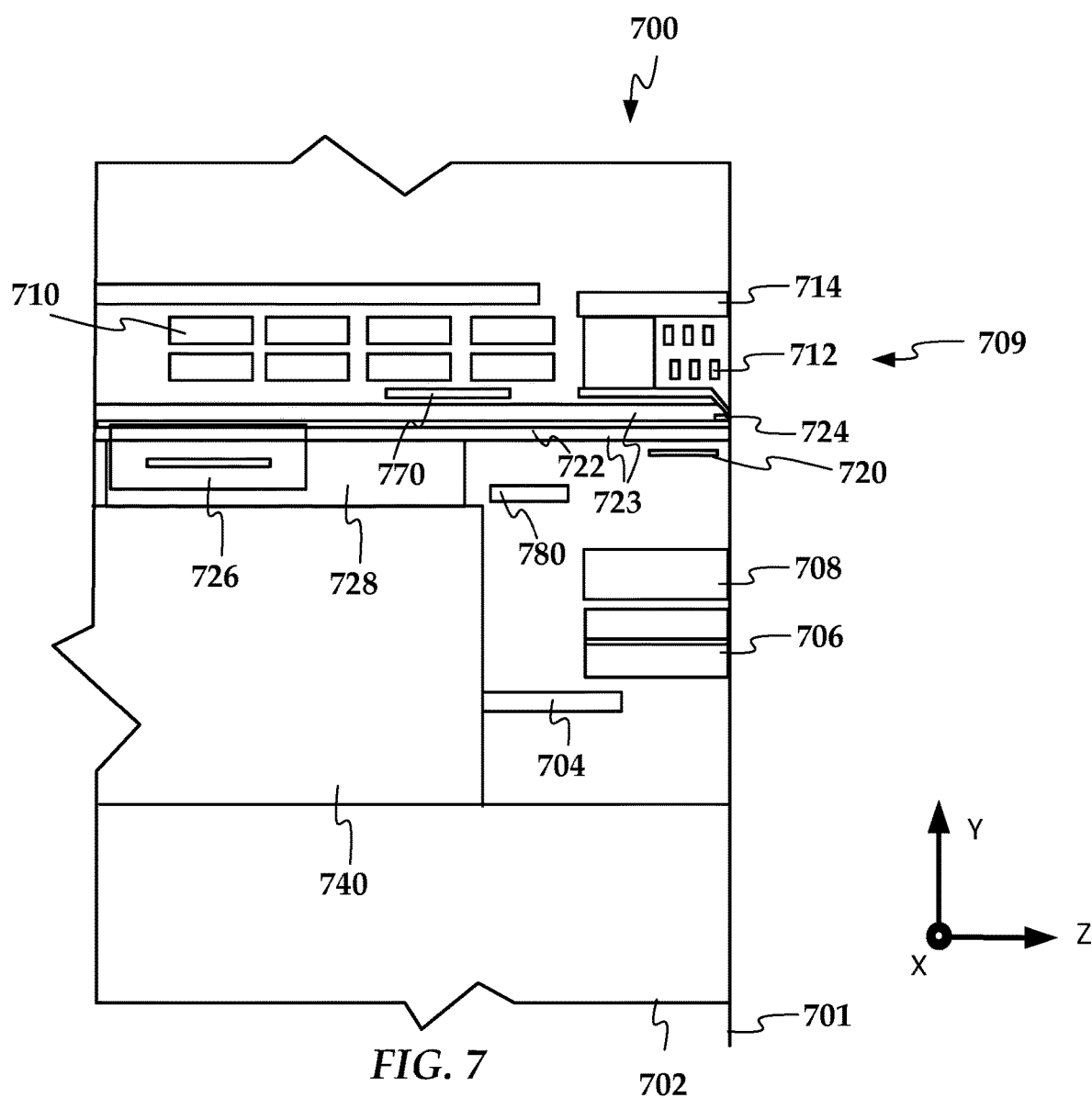
FIG. 7 illustrates a cross-sectional view showing an arrangement of a recording head in accordance with embodiments described herein.

In FIG. 7 a cross-sectional view shows an arrangement of a recording head 700 according to various embodiments described herein. The recording head 700 is built upon a substrate 702. A reader heater 704 and read transducer 706 are deposited over the substrate 702. The reader heater 704 induces localized thermal expansion to change a clearance between the read transducer 706 and a recording medium (not shown) that is held next to a media-facing surface 701 of the recording head 700. The read transducer 706 is typically a magnetoresistive device that changes resistance in response to local magnetic fields.

Above the read transducer 706 is a return pole 708 that is part of a magnetic write transducer 709. Also included in the write transducer 709 is a pole 708, coils 710, 712, and second return pole 714. A writer heater 720 controls writer clearance through controlled thermal expansion similar to the reader heater 702. The write transducer 709 may operate similar to a conventional (e.g., perpendicular) magnetic writer, except that additional optical components, such as waveguide core 722, waveguide cladding 723, and NFT 724, provide energy to heat the recording medium while writing.

An active laser region 726 is deposited at or below the waveguide core 722. According to varies embodiments, a heat sink 740 is deposited between the read transducer 706 and the laser diode unit 728. The active laser region 726 is part of a laser diode unit 728 formed of one or more non-self-supporting layers of crystalline material. An optical coupler may be configured to receive light from the active region 726 and couple the light to the waveguide core 722. The optical coupler may include any combination of an assistant layer, tapered waveguide section, grating, mirror, etc. The coupled light causes plasmon excitation at the near-field transducer 724 and energy to be directed to a recording medium via the near-field transducer 724. Note that the active region 726 (as well as the rest of the laser diode unit 728) is elongated in the cross-track direction (x-direction). Other optical components may also be placed along the waveguide core 722 between the active laser region 726 and the media-facing surface 701, such as a mode converter, phase converter, stray light blockers/absorbers, etc. According to various embodiments, a reader amplifier is disposed proximate the laser.

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is a known factor which might cause mode hopping in laser diodes. Mode hopping is problematic for HAMR applications, as mode hopping leads to i) laser output power jumping, ii) a magnetic transition occurring earlier or later that what is expected in the down-track direction, and iii) track width decrease or increase in the cross-track direction.

A light detector may be used to determine whether a laser mode hop has occurred. The light detector 770 is disposed between the write coils 710 and the waveguide cladding 723. The light detector 770 may be configured to sense light during the operation of the recording head. For example, the light detector 770 may be configured to detect light while writing data to the recording medium. In some cases, the light detector is a photodetector and/or a bolometer, for example. The amount of light detected may indicate whether a laser mode hop has occurred. According to various configurations, the amount of light detected that qualifies as a mode hop is based on a percentage of stable power flow passing by the light detector. Fluctuations in the light may indicate a power fluctuation. According to various embodiments, the system detects mode hops down to a 10%, 5%, and/or a 1% power fluctuation. For example, if the light fluctuation detected is greater than or equal to 1%, a laser control circuit disposed outside of the recording head triggers a current change in a laser heater 780. The current change causes the heater 780 to change the temperature of the laser to a temperature with a stable laser operation. A laser can have multiple stable temperature ranges. For example, a particular laser may have a stable temperature range window of 5 to 7 degrees and then enter an unstable window temperature range before having another stable temperature range window. The stable temperature range windows can vary between lasers and may be determined in the factory, for example.

Figure 8:
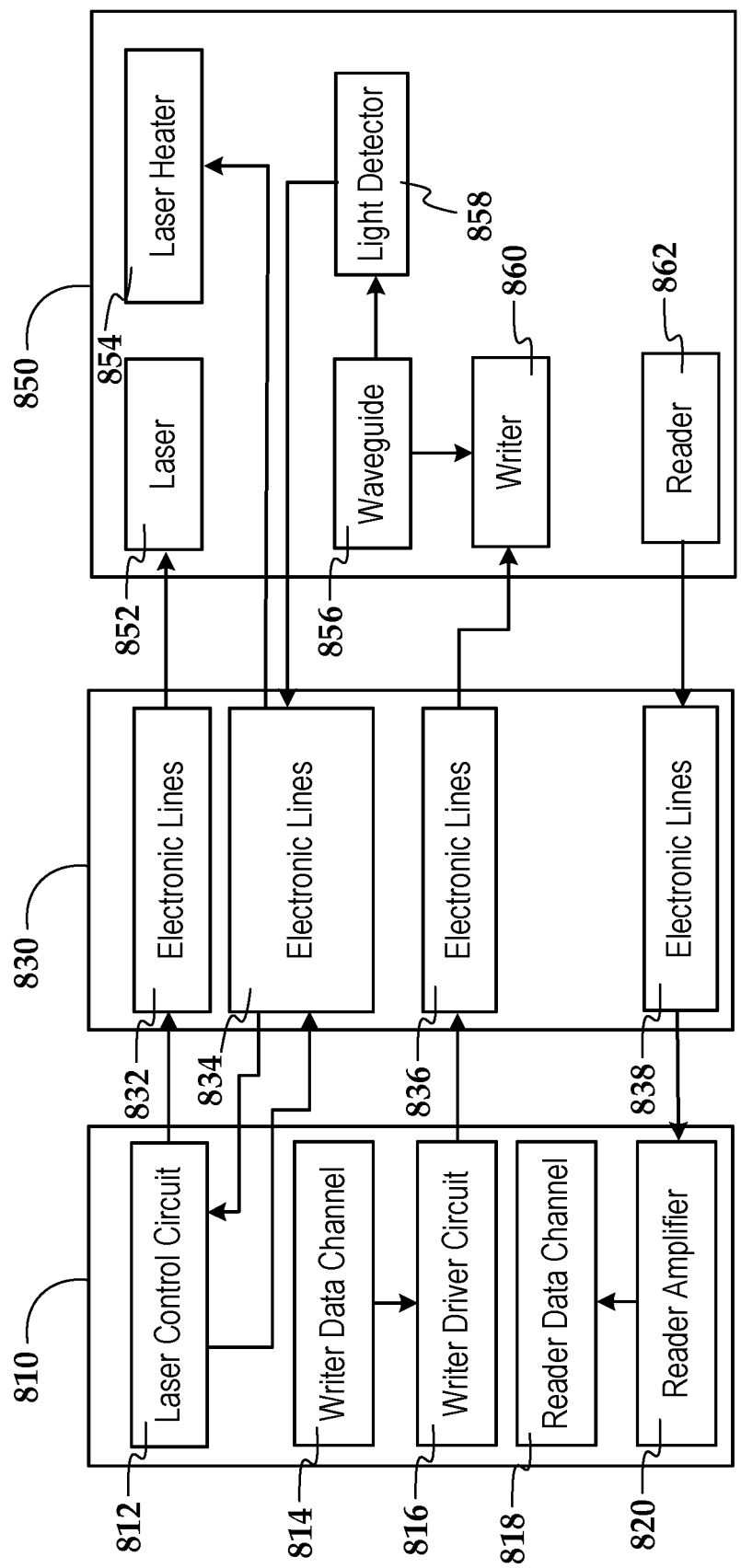
FIG. 8 illustrates a system diagram of the recording head and control electronics in accordance with embodiments described herein.

FIG. 8 illustrates a system diagram of the recording head and control electronics in accordance with embodiments described herein. In this configuration, the control circuit is disposed in a location other than the recording head. For example, laser control circuit 812 may be located on a printed circuit board 810 with the writer data channel 814, the writer driver circuit 816, the reader data channel 818, and the reader amplifier 820. The printed circuit board 810 communicates with the recording head 850 via electric lines 832, 834, 836, 838 on a connecting cable 830. The recording head 850 includes a laser 852, a laser heater 854, a waveguide 856, a light detector 858, a writer 860, and a reader 862. The light detector 858 detects light proximate the waveguide 856. The laser control circuit 812 determines whether the amount of light detected from the light detector 858 is greater than or equal to a predetermined threshold. If the amount of light detected is greater than or equal to the predetermined threshold, the laser control circuit 812 adjusts the current provided to the laser heater 854 to change the temperature at and/or near the laser 852 to a temperature with a stable operation.

Figure 9:
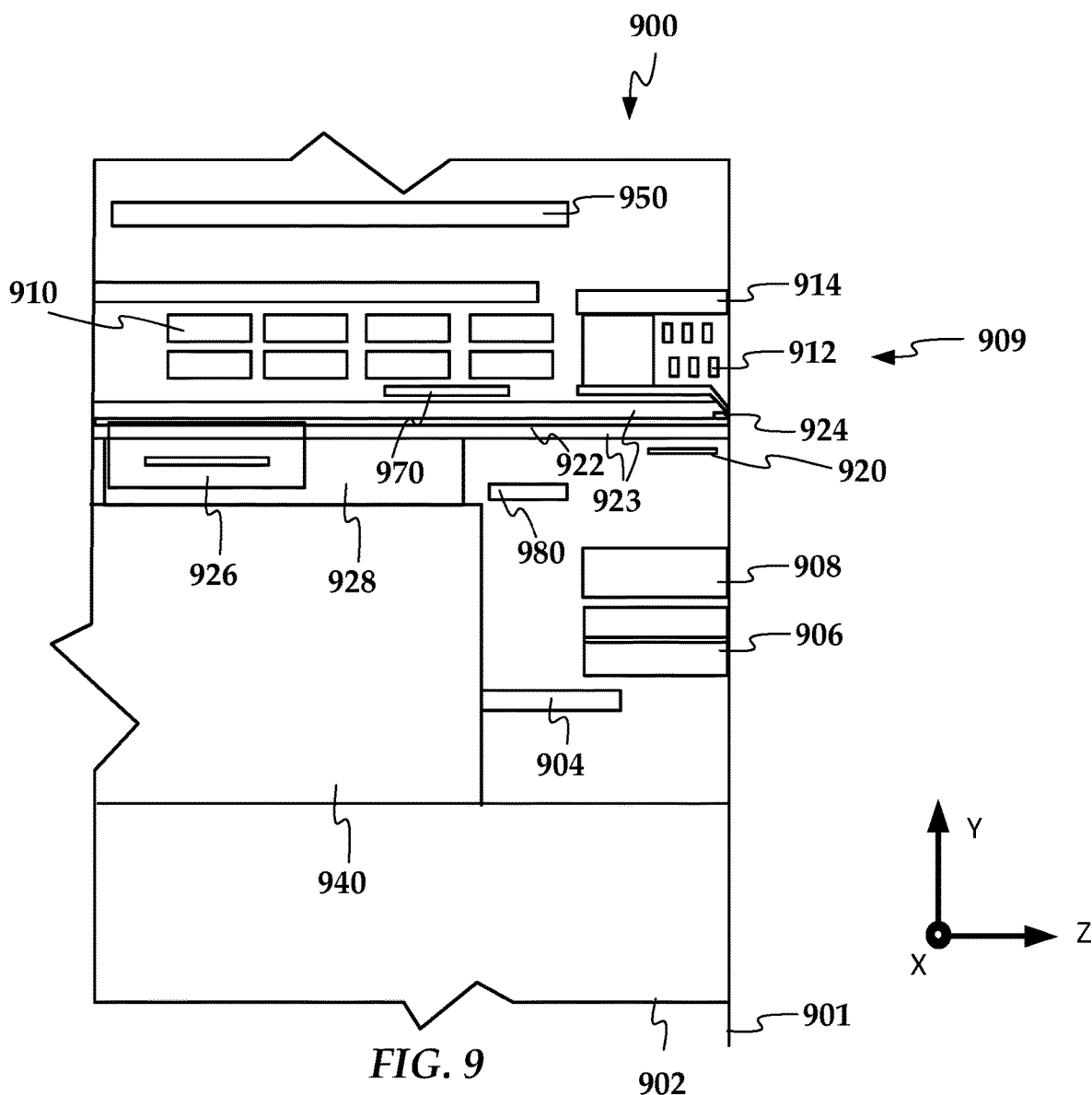
FIG. 9 illustrates a cross-sectional view showing an arrangement of a recording head having the laser control circuit on the recording head in accordance with embodiments described herein.
Figure 10:
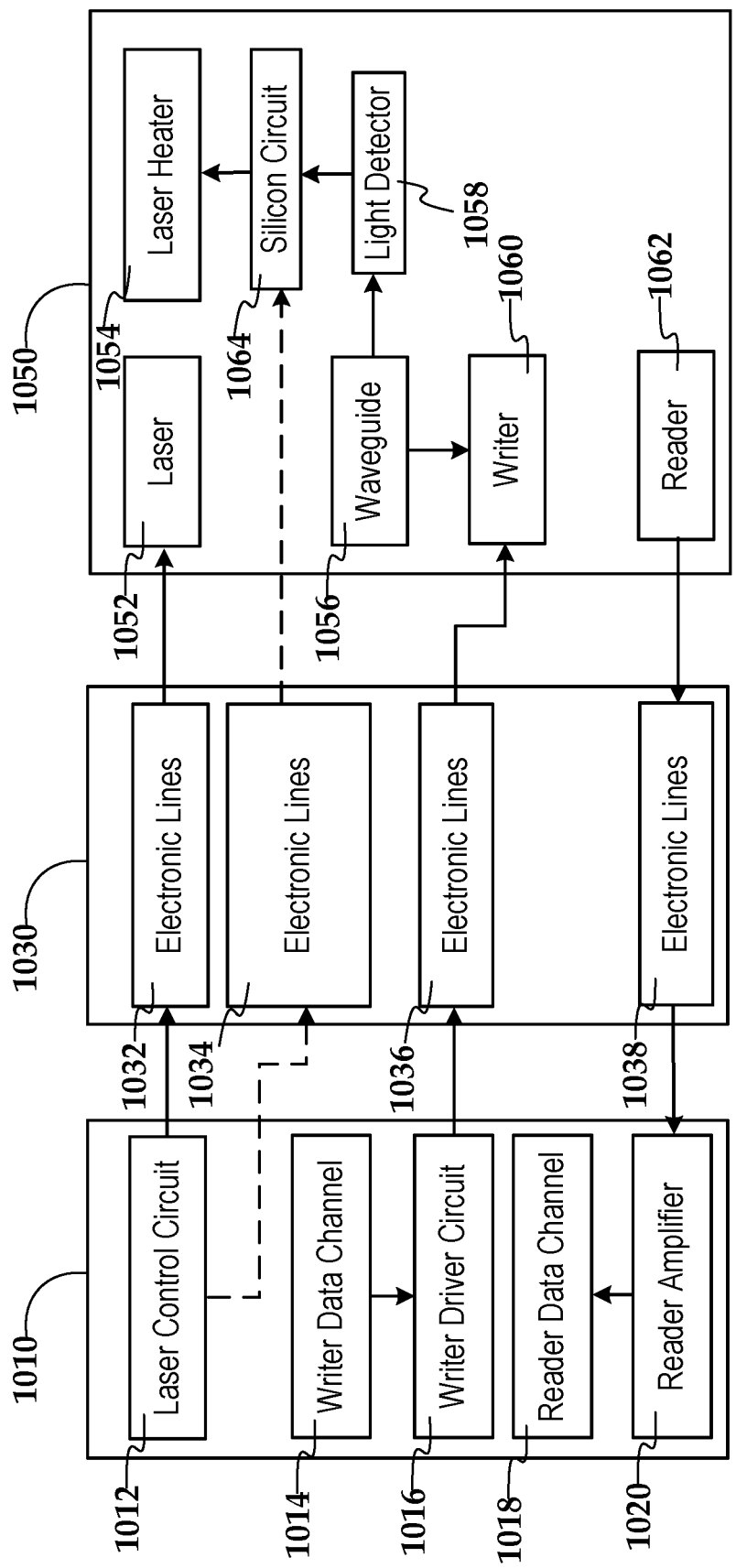
FIG. 10 illustrates a system diagram of the recording head and control electronics in accordance with embodiments described herein.

According to various implementations, the laser control circuit is disposed on the recording head. FIGS. 9 and 10 illustrate embodiments in which the laser control circuit is disposed on the recording head in accordance with embodiments described herein. The recording head 900 is built upon a substrate 902. A reader heater 904 and read transducer 906 are deposited over the substrate 902.

Above the read transducer 906 is a return pole 908 that is part of a magnetic write transducer 909. Also included in the write transducer 909 is a pole 908, coils 910, 912, and second return pole 914. A writer heater 920 controls writer clearance through controlled thermal expansion similar to the reader heater 902.

An active laser region 926 is deposited at or below the waveguide core 922. According to varies embodiments, a heat sink 940 is deposited between the read transducer 906 and the laser diode unit 928. The active laser region 926 is part of a laser diode unit 928 formed of one or more non-self-supporting layers of crystalline material. An optical coupler may be configured to receive light from the active region 926 and couple the light to the waveguide core 922. The optical coupler may include any combination of an assistant layer, tapered waveguide section, grating, mirror, etc. The coupled light causes plasmon excitation at the near-field transducer 924 and energy to be directed to a recording medium via the near-field transducer 924. Note that the active region 926 (as well as the rest of the laser diode unit 928) is elongated in the cross-track direction (x-direction). Other optical components may also be placed along the waveguide core 922 between the active laser region 926 and the media-facing surface 901, such as a mode converter, phase converter, stray light blockers/absorbers, etc.

A light detector 970 is disposed between the write coils 910 and the waveguide cladding 923. The light detector 970 may be configured to sense light during the operation of the recording head. For example, the light detector 970 may be configured to detect light while writing data to the recording medium. The amount of light detected may indicate whether a laser mode hop has occurred If the amount of light detected is greater than or equal to a predetermined threshold, a laser control circuit 950 disposed in the recording head triggers a current change in a laser heater 980. The current change causes the heater 980 to change the temperature near the laser to a temperature with a stable laser operation FIG. 10 illustrates a system diagram of the recording head and control electronics. In this configuration, the control circuit is disposed in the recording head. For example, laser control circuit 1012 may be located on a silicon circuit 1064 on the recording head 1050. The writer data channel 1014, the writer driver circuit 1016, the reader data channel 1018, and the reader amplifier 1020 are disposed on a printed circuit board 1010. The printed circuit board 1010 communicates with the recording head 1050 via electric lines 1032, 1034, 1036, 1038 on a connecting cable 1030. The recording head 1050 includes a laser 1052, a laser heater 1054, a waveguide 1056, a light detector 1058, a writer 1060, a reader 1062, and the silicon circuit 1064. The light detector 1058 detects light proximate the waveguide 1056. The laser control circuit 1012 determines whether the amount of light detected from the light detector 1058 is greater than or equal to a predetermined threshold. If the amount of light detected is greater than or equal to the predetermined threshold, the laser control circuit adjusts the current provided to the laser heater 1054 to change the temperature at and/or near the laser 1052 to a temperature with a stable operation.

Figure 11:
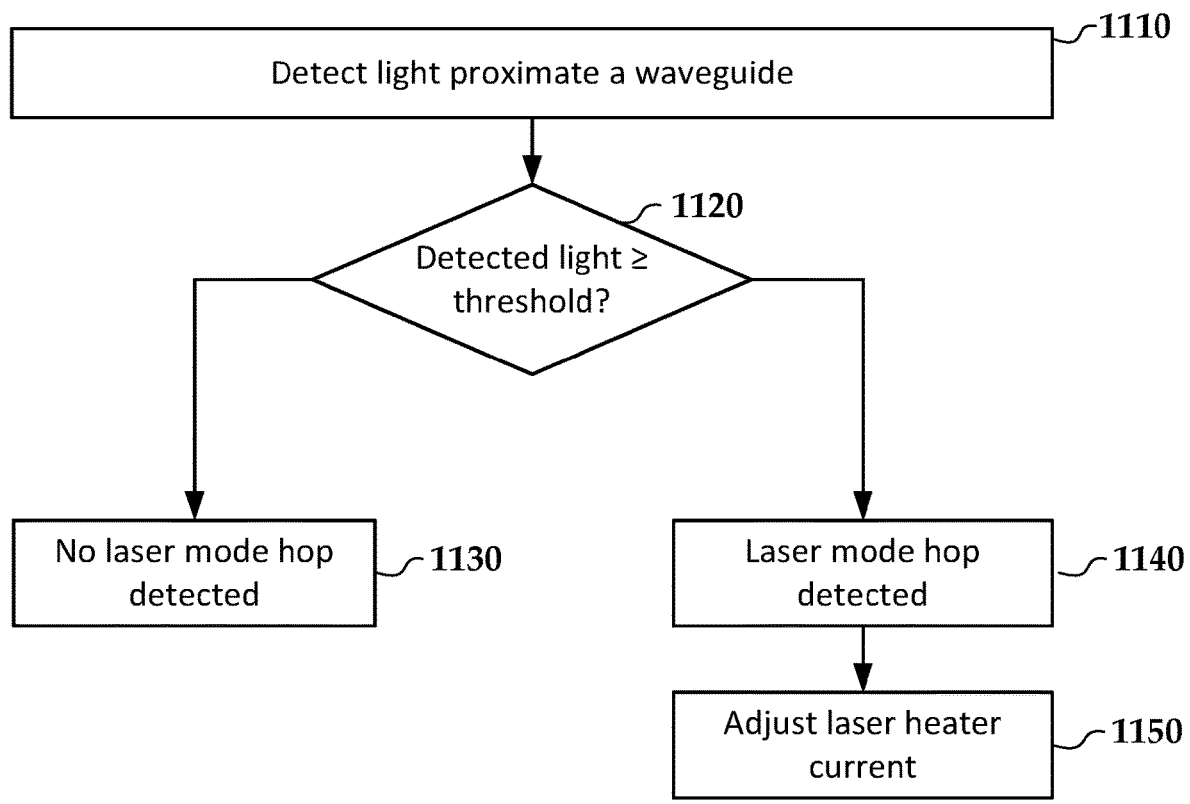
FIG. 11 illustrates a flow diagram for controlling the stability of a laser on a recording head in accordance with embodiments described herein.

FIG. 11 illustrates a flow diagram for controlling the stability of a laser on a recording head in accordance with embodiments described herein. Light is detected 1110 proximate a waveguide of a recording head by a light detector. According to various embodiments, the light is detected while the recording head is writing data to a recording medium. It is determined 1120 whether the amount of light detected is greater than or equal to a predetermined threshold. If the amount of light detected is not greater than or equal to the predetermined threshold, the system determines 1130 that no laser mode hop has occurred and the current provided to the laser heater does not change. If the amount of light detected is greater than or equal to the predetermined threshold, the system determines 1140 that a laser mode hop has occurred and the current to the laser heater is adjusted 1150.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. An apparatus, comprising:
a substrate;
a laser formed on a non-self supporting stricture and bonded to the substrate;
a waveguide deposited proximate the laser, the waveguide configured to communicate light from the laser to a near-field transducer that directs energy resulting from plasmonic excitation to a recording medium;
a light detector configured to detect an amount of light fluctuation;
at least one laser heater disposed proximate the laser; and
a controller configured to:
determine if the amount of light fluctuation is greater than or equal to about 1%;
control current supplied to the at least one heater if it has been determined that the amount of light fluctuation is greater than or equal to about 1%.

2. The apparatus of claim 1, wherein the light detector is configured to detect the amount of light fluctuation while writing data to the recording medium.

3. The apparatus of claim 1, wherein the controller is configured to determine that a laser mode hop has occurred based on the detected amount of light fluctuation.

4. The apparatus of claim 3, wherein the controller is configured to determine that a laser mode hop has occurred if the detected light fluctuation is greater than 1%.

5. The apparatus of claim 1, wherein the controller is disposed in a recording head.

6. The apparatus of claim 1, wherein the light detector is a photodetector.

7. The apparatus of claim 1, wherein the light detector is a bolometer.

8. The apparatus of claim 1, wherein the controller is configured to control current supplied to the at least one heater to bring the temperature of the laser to a predetermined temperature range.

9. A system, comprising:
a recording head comprising:
a substrate;
a laser formed on a non-self supporting structure and bonded to the substrate;
a waveguide deposited proximate the laser, the waveguide configured to communicate light from the laser to a near-field transducer that directs energy resulting from plasmonic excitation to a recording medium; and
a light detector configured to detect an amount of light fluctuation;
at least one laser heater disposed proximate the laser; and
a controller configured to:
determine if the amount of light fluctuation is greater than or equal to about 1%;
control current supplied to the at least one if it has been determined that the amount of light fluctuation is greater than or equal to about 1%.

10. The system of claim 9, wherein the light detector is configured to detect the amount of light fluctuation while writing data to the recording medium.

11. The system of claim 9, wherein the controller is configured to determine that a laser mode hop has occurred based on the detected amount of light fluctuation.

12. The system of claim 11, wherein the controller is configured to determine that a laser mode hop has occurred if the detected amount of light fluctuates by at least 1%.

13. The system of claim 9, wherein the controller is disposed in a recording head.

14. The system of claim 9, wherein the light detector is a photodetector.

15. The system of claim 9, wherein the light detector is a bolometer.

16. The system of claim 9, wherein the controller is configured to control current supplied to the at least one heater to bring the temperature of the laser to a predetermined temperature range.

17. A method comprising:
detecting an amount of light fluctuation proximate a waveguide of a recording head;
determining whether the amount of light fluctuation detected is greater than or equal to about 1%;
if it is determined that the amount of light fluctuation detected is greater than or equal to about 1%, adjusting a current provided to a laser heater for an on-wafer laser of the recording head.

18. The method of claim 17, wherein detecting the amount of light fluctuation proximate the waveguide comprises detecting the amount of light proximate the waveguide during a writing operation of the recording head.

19. The method of claim 17 further comprising determining that a laser mode hop has occurred if it is determined that the amount of light fluctuation detected is greater than or equal to the threshold.

20. The method of claim 17, wherein adjusting the current provided to a laser heater for an on-wafer laser of the recording head comprises adjusting the current supplied to the laser heater to bring the temperature of the laser to a predetermined temperature.

* * * * *